United States Patent
Gunter et al.

(10) Patent No.: US 7,254,136 B1
(45) Date of Patent: Aug. 7, 2007

(54) BEACON PROTOCOL FOR INTERNET CONNECTION SHARING DEVICES

(75) Inventors: David V. Gunter, Redmond, WA (US); Dennis A. Morgan, Issaquah, WA (US); Kenneth L. Crocker, Sammamish, WA (US); Eduard Guzovsky, Weston, MA (US); Richard H. Lamb, Seattle, WA (US); Bruce Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 09/794,586

(22) Filed: Feb. 27, 2001

(51) Int. Cl.
 *H04L 12/66* (2006.01)
(52) U.S. Cl. .................................... 370/401
(58) Field of Classification Search ............... 370/254, 370/351, 400, 401
 See application file for complete search history.

(56) References Cited

U.S. PATENT DOCUMENTS 5,724,356 A * 3/1998 Parameswaran Nair et al. . 370/401
6,307,868 B1 * 10/2001 Rakib et al. ................ 370/485

OTHER PUBLICATIONS

"Load-Balancing Act [Firewall Security]", *Communications News*, vol. 36, No. 9, Sep. 1999, p. 28, 30.
Clark, D.; "Network Nirvana and the Intelligent Device", *IEEE Concurrency*, vol. 7, No. 2, Apr.-Jun. 1999, p. 16-19.
Williams, A.; "Jini: The Universal Network?", *WEB Techniques*, vol. 4, No. 3, Mar. 1999, p. 55-56, 58, 60.
Saunders, A.; "Universal Plug for Net Appliances", http://www.techweb.com/se/directlink.cgi?EET19990510S0056, May 10, 1999, Issue: 1060, p. 1-5.
"Universal Plug and Play (UpnP): Sun's Jini", http://www.twice.com/homenetworks/standards/universal.htm, Viewed Sep. 22, 2000. p. 1.
"About the Universal Plug and Play Forum", http://www.upnp.org/forum/, Viewed Sep. 22, 2000, p. 1-11.

* cited by examiner

*Primary Examiner*—Derrick W. Ferris
(74) *Attorney, Agent, or Firm*—Amin, Turocy & Calvin, LLP

(57) ABSTRACT

A system and method is provided for detecting, monitoring and maintaining an Internet Connection Sharing Device (ICSD). An ICSD may be connected to one or more devices, and/or applications associated with a Local Area Network (LAN), which devices, and/or applications, may attempt to detect, monitor and maintain the ICSD. Thus, a broadcast protocol for advertising status and services and a unicast request/response protocol are provided to facilitate such detection, monitoring and maintenance.

28 Claims, 11 Drawing Sheets

BEACON PROTOCOL FOR INTERNET CONNECTION SHARING DEVICES

TECHNICAL FIELD

The present invention relates generally to computer networks and more particularly to a system whereby applications and LAN devices can detect, monitor and update the status of an Internet Connection Sharing Device (ICSD).

BACKGROUND

As the number of local area networks (LANs) have increased, Internet Connection Sharing Devices (ICSDs) have become more common. An ICSD may serve as a gateway to the Internet for a LAN. Rather than having each device on a LAN acquire its own Internet connection, the LAN devices may benefit from sharing one Internet connection. Such sharing may be accomplished via an ICSD. An ICSD may be a device dedicated to its role as an ICSD or it may be a process running on a device connected to the Internet and the LAN. Conventionally, detecting the presence of such ICSDs by applications running on devices connected to a LAN has been difficult. For example, an ICSD may not have been located at a well-known port address, an ICSD may not have advertised it services, and/or there may not have been a method for communicating the status of an ICSD to applications and devices connected to a LAN.

As the gateway to the Internet for the LAN, the status of the ICSD may be important to other applications and devices connected to the LAN. For example, if a device connected to the LAN requests a file from the Internet, and that file was not received, the device may attempt to determine whether there was a problem with the file transfer itself or with the ICSD. Conventionally, monitoring the ICSD from applications running on devices connected to a LAN has been difficult. Similarly, controlling an ICSD may be an important aspect of LAN management. Such control of an ICSD may be difficult because there may not have been a protocol for communicating with an ICSD. For example, an application running on a device on the LAN, and/or a device on the LAN, may request that the ICSD report on the status of a connection, and then selectively change the status of that connection. This has been difficult to achieve since there may have been no protocol for querying the status of an ICSD. Similarly, applications running on devices connected to a LAN may interrogate the status of an ICSD, change that status, and selectively modify the behavior of the application based on the status, and the attempt to change the status. This has been difficult to achieve since there may have been no Application Programming Interface (API) with which an application could interact to gain access to the ICSD.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method for detecting, monitoring and maintaining an ICSD from one or more devices, and/or applications, connected to a network (e.g. LAN). The present invention provides a broadcast protocol for detecting an ICSD and for reporting the status of an ICSD. A unicast mode protocol is provided to facilitate monitoring and maintaining the ICSD status. The present invention further provides an Application Programming Interface (API) to facilitate writing applications that can access the ICSD via the broadcast and unicast protocols, thus facilitating adapting an application's behavior based on the ICSD status and response to requests to change its status. The API further facilitates applications querying the status of the ICSD and selectively requesting that the ICSD change its status (e.g. connect, disconnect from ISP)

Before LAN devices may utilize an ICSD, the LAN devices may need to detect that an ICSD is available and then determine services available from that ICSD. Based on the presence of an ICSD and the services available from that ICSD, a LAN device may select whether and how to interact with the ICSD. For example, an application may determine that an ICSD is present and that it provides a DSL connection of 1 Mbps. The application may thus decide to access the Internet via the ICSD rather than by utilizing the internal 56 Kbps modem of the device on which the application is running.

When multiple LAN devices share an Internet connection, the status of the ICSD may be important to the devices. Thus, in accordance with the present invention, when the state of the ICSD changes, the ICSD can broadcast a status message to the devices connected to the LAN relating to that change of state. For example, if the ICSD DSL connection becomes unavailable, the ICSD can broadcast such unavailability to the devices connected to the LAN. Such devices may then decide to access the Internet via other means, such as their own internal modems.

Applications running on devices connected to a LAN may attempt to adapt behavior based on the presence of an ICSD and the services of that ICSD. For example, a web browser may determine that it will run in a first graphics mode if the ICSD provides a first Internet connection speed. The browser may determine that it will run in a second graphics mode if the ICSD provides a second Internet connection speed.

An application may also request the ICSD change its connection status. For example, a web browser may request a first amount of the bandwidth available at the ICSD for graphics downloads while requesting a second amount of the bandwidth available at the ICSD for text downloads. In accordance with the present invention, applications running on devices on the LAN connected to the ICSD can generate such requests, and can alter their behavior based on the ICSD response to such requests.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
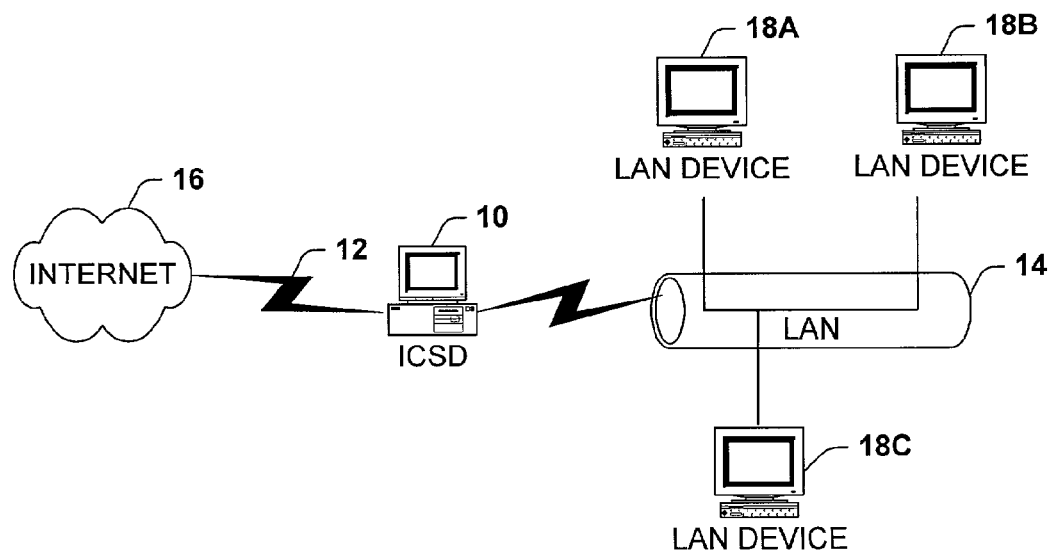
FIG. 1 illustrates an Internet Connection Sharing Device (ICSD) facilitating sharing of an Internet connection in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "monitor" is intended to refer to a computer-related entity, either hardware, a combination of hardware and software, software, or software in execution. For example, a monitor may be, but is not limited to being, a process running on a processor, a processor, an object, an executable, a thread of execution, a program and a computer. By way of illustration, both an application running on a server and the server can be monitors.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Turning now to FIG. 1, an Internet Connection Sharing Device (ICSD) 10 facilitates sharing a connection 12 from a network 14 to the Internet 16. The ICSD 10 may be a computer executing a process that facilitates time-sharing or frequency sharing of the Internet connection 12, for example. The connection 12 can be, for example, a modem connection, a DSL connection and/or a wireless connection. The network 14 may be, for example, an Ethernet LAN, a token ring LAN, or other LAN. Although the invention is primarily described within the context of a LAN, it is to be appreciated that the network 14 may include a Wide Area Network (WAN). Moreover, the network 14 can include hardwired and/or optical and/or wireless connection paths. The connection 12 can be shared between a plurality of devices (collectively referred to as the LAN devices 18) 18A, 18B, 18C connected to the network 14. The LAN devices 18 can include, but not be limited to, personal computers, workstations, televisions and telephones, for example. Sharing of the connection 12 facilitates reducing the cost of one or more of the LAN devices, reduces the complexity of managing the network 14 and optimizes the throughput of the connection 12. To facilitate sharing the connection 12, the ICSD 10 may advertise the presence of the ICSD 10 and the services available to the LAN devices 18 from the ICSD 10.

Figure 2:
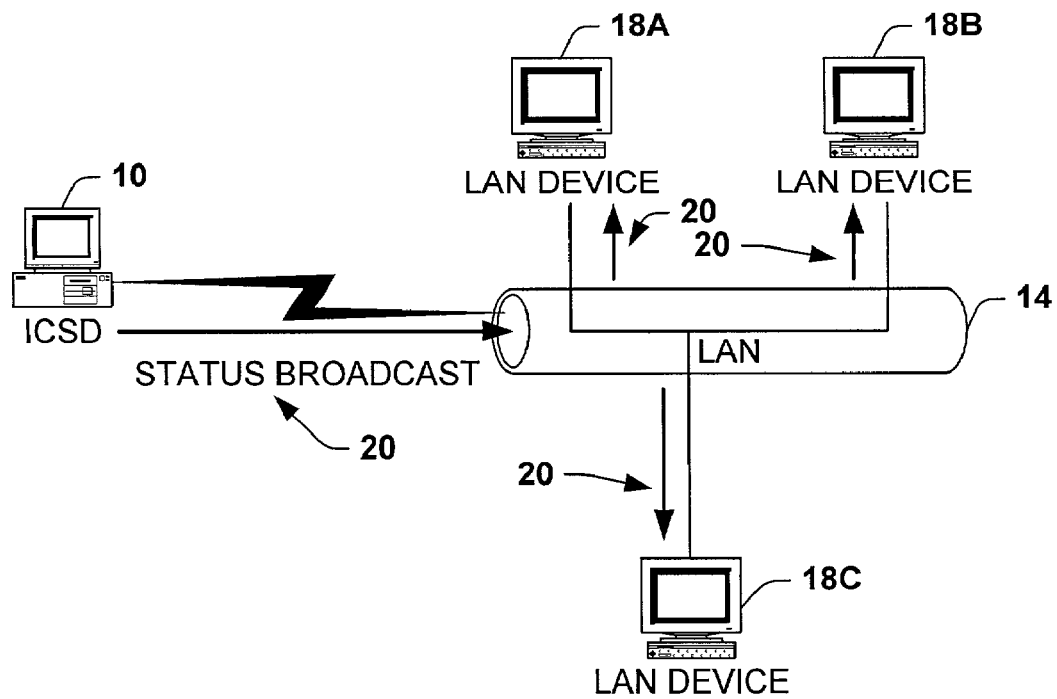
FIG. 2 illustrates an ICSD broadcasting a status message in accordance with an aspect of the present invention.

Thus, turning to FIG. 2, the ICSD 10 can broadcast a status message 20 to the LAN devices 18 via the network 14. The status message 20 can include information concerning the state of the ICSD 10. For example, the status message may include information concerning the presence or absence of the connection 12 (FIG. 1) and the speed of the connection 12 (FIG. 1). By way of illustration, to transmit the status broadcast 20 to the LAN devices 18, the ICSD 10 may send a UDP broadcast packet with the destination UDP port set to a well known port address (e.g. ICSLAP_PORT). The contents of this packet may include an Information Element (IE) expressing the current connection state to the Internet, whether via a dial-up modem or some other form like a cable modem, for example. Other IE's in this broadcast packet may include general ICSD status information. One exemplary status broadcast message may include, for example, the IEs described in Table 1.

TABLE 1

| | |
|---|---|
| DIAL_STATE | state of ICSD connection to the Internet |
| STATISTICS | number of nodes, ICSD state, byte counters, IP address as seen on the Internet |
| DOMAIN_NAME | domain name as seen on the Internet |
| LOCALTIME | time on the ICSD |

Table 2 provides an exemplary format of a packet.

TABLE 2

| | |
|---|---|
| Destination Ethernet: | FF FF FF FF FF FF |
| Source Ethernet: | XX XX XX XX XX XX |
| IP destination: | 255.255.255.255 |
| IP source: | ip.addr.of.icsd |
| UDP destination: | ICSLAP_PORT |
| UDP source: | ICSLAP_PORT |
| DATA: | \|response=1\|broadcast=1\|id=0\|no of bytes in whole packet\| |

TABLE 2-continued

|error=0|DIAL_STATE|frag=0|seq=0|12+length of dial state data|dial state data|
|error=0|STATISTICS|frag=0|seq=0|12+length of statistics data|statistics data|
|error=0|DOMAIN_NAME|frag=0|seq=0|12+length of dmn name data|domain name data|
|error=0|LOCALTIME|frag=0|seq=0|12+length of localtime data|localtime data|

In the sample UDP packet, the byte counters and state in the STATISTICS IE facilitate verifying that the ICSD 10 is processing packets to and from the Internet. An ICSD state variable may be included and incremented when the ICSD 10 changes state. Thus, if a device was momentarily disconnected from the network 14, it can detect that there was a change and take steps to update itself. One such step may be to renew its Dynamic Host Configuration Protocol (DHCP) lease, for example.

Broadcast packets may be broadcast when predetermined events occur such as the change in the connection to the Internet and also periodically, according to a pre-determined timing method. By way of further illustration, an exemplary broadcast message similar to that provided in Table 3 may be transmitted in response to a change in the dial state on the ICSD 10. In the example in Table 3, the ICSD 10 may have changed from an IDLE to a DIALING state. This may cause a broadcast to the LAN devices 18 from the ICSD 10.

TABLE 3

RESPONSE PACKET: (Ethernet broadcast)
|IP(RESPONDER->BROADCAST)|UDP(ICSLAP_PORT->ICSLAP_PORT)
|0xC000 0000|0x0000 0088|
0x0000 000F|0x0000 0000|0x0000 0014|0x0000 0007|0x0000 0000|
0x0000 0008|0x0000 0000|0x0000 003C|
0x0003|0x0001|0x0012 D4DF|0x0012 DF2A|0x000F 6902|0x000F 89BF|
0x0000 0003|0x0000 003A|0x836B 200C|0x0000 B114|
0x0000 0232|0x000005B4|0x0000 0005|
0x0000 0011|0x0000 0000|0x0000 001C|0x0000 0000|"mediaone.net"|
0x0000 0014|0x0000 0000|0x0000 001C|
0x01BF 1B54|0xC317 7B20|
0x380E 5361|
0x0000 0000|

The packet illustrated above in Table 2 contains several IEs, each of which relate different information. The first IE in the message is an ICSLAP_DIAL_STATE with value ICSLAP_DIALING. The ICSLAP_DIAL_STATE IE may be employed to characterize the state of the ICSD concerning establishing, maintaining, or disestablishing a connection to the Internet. The IE may be represented by the pseudocode contained in Table 4.

TABLE 4

```
typedef struct_ICS_DRIVER_DIAL_STATE
{
ICS_DIAL_STATE state = 7
DWORD options = 0
}ICS_DRIVER_DIAL_STATE;
```

The next IE in the packet provided in Table 2 is an ICSLAP_STATISTICS IE. The ICSLAP_STATISTICS IE may be employed to relate information concerning statistics maintained by the ICSD, for example, the number of packets sent (dwPacketsSent) and the number of packets received (dwPacketsReceived). The IE may be implemented as in the pseudocode contained in Table 5.

TABLE 5

```
typedef struct_ICS_IOCTL_STATISTICS
{
USHORT MajVer = 3
USHORT MinVer = 1
DWORD dwBytesSent = 1234143
DWORD dwBytesRecv = 1236778
DWORD dwPacketsSent = 1009922
DWORD dwPacketsReceived = 1018303
DWORD dwActiveClients = 3
DWORD dwDynamicPortMappings = 58
DWORD ipAddr = 131.107.32.12
DWORD dwMemUsed = 45332
DWORD dwUptime = 562
DWORD dwNatMss = 1460
DWORD icsStateSequence = 0x00000005
}ICS_IOCTL_STATISTICS;
```

The next IE in the packet provided in Table 2 is a DOMAIN NAME IE. The DOMAIN_NAME IE may be used to provide the name of the domain with which the ICSD is associated. The DOMAIN_NAME IE may be implemented in the pseudocode provided in Table 6.

TABLE 6

```
typedef struct_ICS_DRIVER_DOMAIN_NAME
{
DWORD    options = 0
char     dn[1] = "mediaone.net"
} ICS_DRIVER_DOMAIN_NAME;
```

The next IE in the broadcast response packet provided in Table 2 is the LOCAL_TIME IE. The LOCAL_TIME IE may be used to track the time at the ICSD 10. The LOCAL_TIME IE may be implemented in pseudocode as detailed in Table 7.

TABLE 7

```
typedef struct_ICS_LOCALTIME_CB
{
ULONGLONG    lltime = 0x01BF 1B54 C317 7B20;
             /* in 100's of nanoseconds since 1600 AD */
DWORD        ltime = 940462945 seconds
DWORD        options;
} ICS_LOCALTIME_CB;
```

Figure 3:
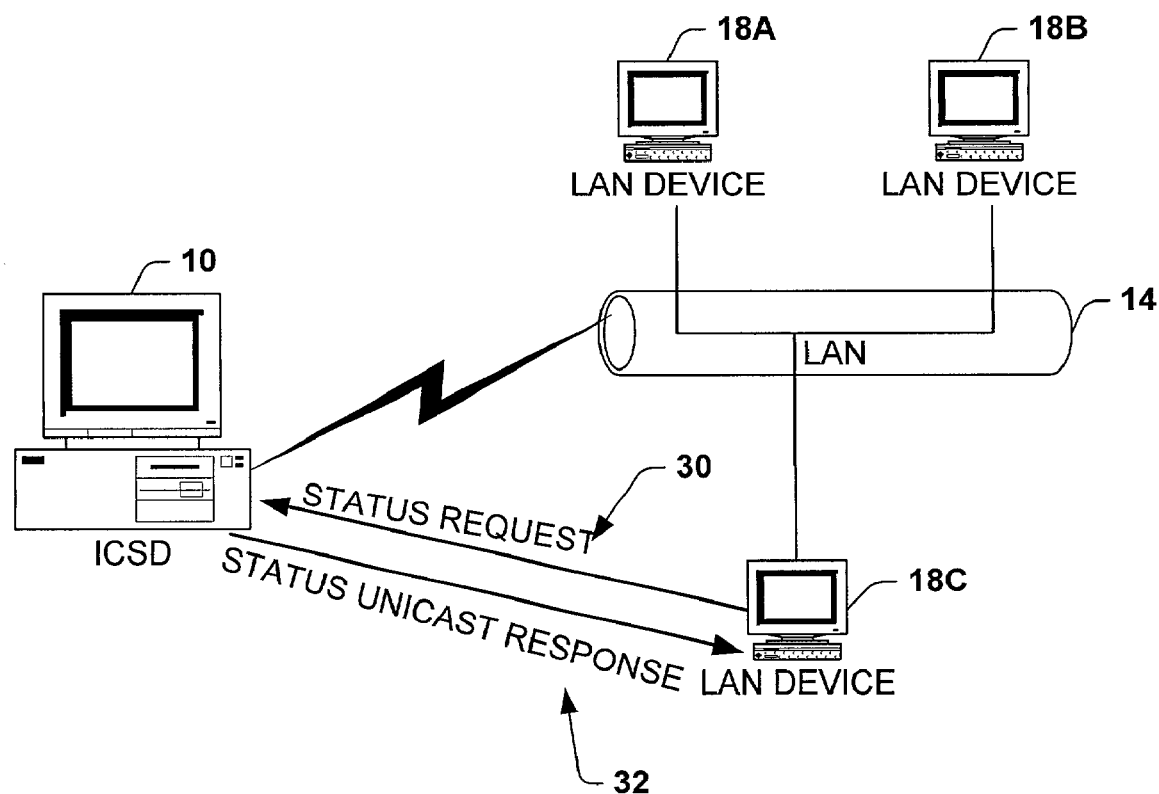
FIG. 3 illustrates an ICSD receiving a status request and producing a status unicast response in accordance with an aspect of the present invention.

FIG. 3 illustrates the ICSD 10 receiving a status request 30 and producing a status unicast response 32. If a LAN device 18C requests the ICSD 10 status, the LAN device 18C may send, for example, the status request 30 to the ICSD 10. This status request 30 may cause a status unicast response 32 to be generated. The LAN device 18C may send a status request 30 when first booted or when rebooted to advertise its presence to the ICSD 10 and also to determine whether one or more ICSDs are available. A status request 30 may also be sent when the LAN device 18C attempts to synchronize with an ICSD network. The status request may be sent in a unicast UDP packet with UDP destination port equal to a well-known port (e.g. ICSLAP_PORT).

By way of illustration, a sample LAN ICSLAP_PORT_MAPPINGS device request for a list of the port mappings on the ICSD 10 may have the format detailed in Table 8.

TABLE 8

REQUEST PACKET:
|IP(REQUESTOR->RESPONDER)|UDP(1239->ICSLAP_PORT)
|0x0912 3456|0x0000 0014|0x0000 0006|0x0000 0000|0x0000 000C|

The exemplary request packet may have a field configured to indicate the packet is a request and not a broadcast. In the sample request packet in Table 8, the ID number located in the first field is 0x0912 3456. The total length of the example packet is 20 bytes (0x0000 0014) and the length of the IE is 12 (0x0000 0000C). The sequence number is 0. The UDP source port (1239) may be a location that the operating system or other network 14 or LAN device 18 managing component (not illustrated) selected for this connection.

A sample response to the sample request may have the following format described in Table 9.

TABLE 9

RESPONSE PACKET:
|IP(RESPONDER->REQUESTOR)|UDP(ICSLAP_PORT->1239)
|0x8912 3456|0x0000 005C|0x0000 0006|0x0000 0000|0x0000 0054|
|0x0087|0x008B|0x0002|0x0008|0x0000 0000|
|0x0087|0x008B|0x0001|0x0008|0x0000 0000|
|0x15FF|0x15FF|0x0001|0x0000|0xC0A8 0002|
|0x15FF|0x15FF|0x0002|0x0000|0xC0A8 0002|
|0x1600|0x1600|0x0001|0x0000|0xC0A8 0002|
|0x1600|0x1600|0x0002|0x0000|0xC0A8 0002|

The response packet provided in Table 9 may be sent, for example, from a well-known port (e.g. ICSLAP_PORT) to the requesting port. The ID field (e.g. the first field in the packet) may have its high bit set indicating a response packet. The remainder of the ID field reflects the ID contents of the original request so that the requestor may match up request and response. The total length of the exemplary packet in Table 9 is 92 bytes (0x000 005C) and the length of the ICSLAP_PORT_MAPPINGS IE is 84 bytes (0x0000 0054). The ICSLAP_PORT_MAPPINGS IE may be followed by a sequence of ICS_DRIVER_PORT_MAPPING structures describing the ICSLAP_PORT_MAPPINGS.

The portion of the packet containing such ICS_DRIVER_PORT_MAPPING structures may contain port-mapping structures indicating:

ports 135->139 UDP BLOCKED ports 135->139 TCP BLOCKED port 5631 TCP NORMAL port 5631 UDP NORMAL port 5632 TCP NORMAL port 5632 UDP NORMAL By way of further illustration, in one exemplary protocol facilitating status requests and responses, a request may contain an Information Element (IE) (See Tables 10 and 11 below) while a response may contain multiple IE's. Response packets may be unsolicited. Such response packets may be generated when the ICS device changes state and may be broadcast to more than one LAN device. When broadcast to more than one LAN device the packet may indicate that it is intended for more than one LAN device. A response may also be partitioned into multiple packets. However, broadcast responses should not be fragmented since a partial response may be undecipherable. Sample request and response formats are identified below in Tables 10 and 11.

TABLE 10

Packet Format (field-name:bits-used)

|response:0|broadcast:1|identifier:2-31|total_length:0-31|data(total_length-8 bytes)|

|<----- 32 bits ----------------->|<----32 bits---->|<--- total_length - 8--->|

|<IE-1>|, |<IE-2>|, ................, |<IE-N>|

| | |
|---|---|
| Response: | set if response |
| Broadcast: | set if broadcast UDP |
| Identifier: | combined with source IP address, should yield a unique source. |
| Total_length: | total length of packet in bytes including headers |
| Data: | data field is composed of multiple Information Elements (IE's) |
| IE-1: | first information element |
| IE-2: | second information element |
| IE-N | nth information element |

TABLE 11

IE structure

|error:0|opcode:1-31|fragment:0|sequence:1-31|length|data(length - 12bytes)|
|<--32 bits----->|<---32 bits------>|  |<32b->|<-length-12 bytes->|

| | |
|---|---|
| error: | set if error on op code, usually in response |
| opcode: | opcode below (section 4.4) |
| fragment: | 0 if last fragment, 1 if more to come |
| sequence: | starts at 0 and counts up (wrap if necessary) till the last fragment. |
| Length: | length of IE in bytes including the 12 byte IE header. |

Figure 4:
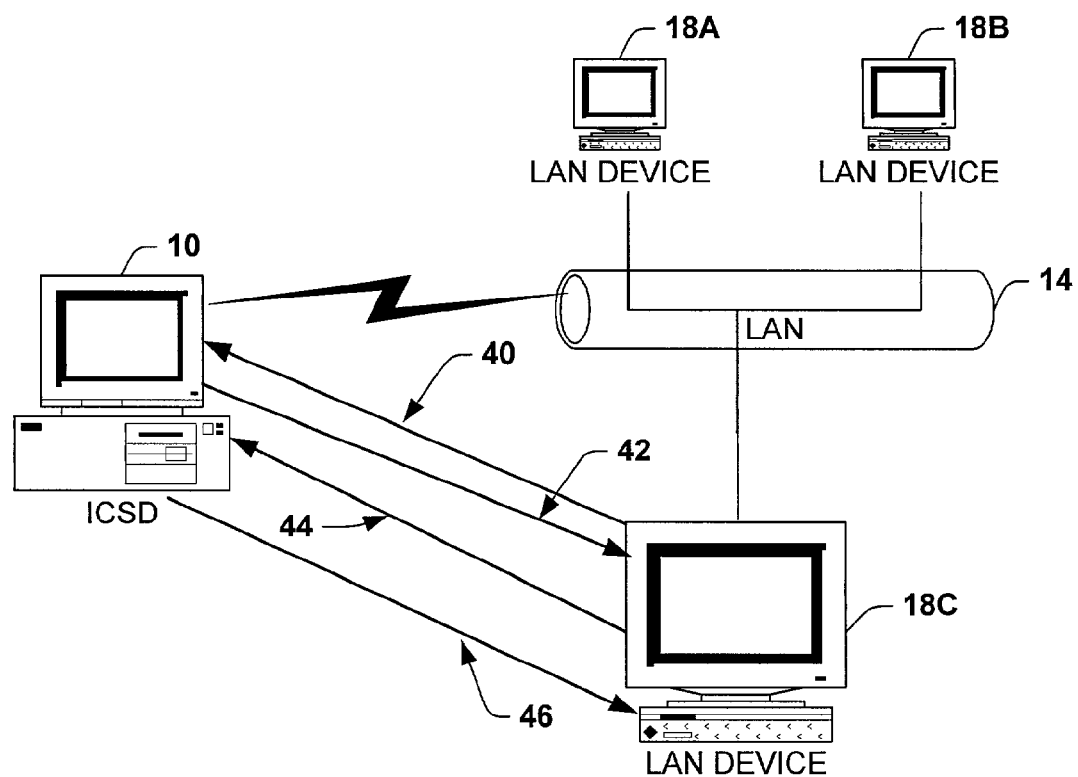
FIG. 4 illustrates an ICSD receiving a request to change its status in accordance with an aspect of the present invention.

Turning now to FIG. 4, an ICSD 10 receiving a request 44 to change its status is illustrated. A LAN device 18C may request the ICSD 10 change its status from a first status to a second status. For example, the LAN device 18C may request that the ICSD 10 establish an Internet connection 12 (FIG. 1) thus causing the ICSD status to change from disconnected to connected. The LAN device 18C may first send a status request 40 to the ICSD 10 to determine the presence or absence of the Internet connection 12 (FIG. 1) via the status of the connection stored by the ICSD. The Internet connection 12 (FIG. 1) status may be returned to the LAN device 18C via a status unicast response 42. The LAN device 18C may then determine, based on the status unicast response 42 to transmit a request 44 for the ICSD 10 to change its status. The ICSD 10 may change its status in response to the request 44, or, if unable to make the requested change, the ICSD 10 may not change its status. In either case, the ICSD 10 can transmit a status broadcast response 46 to inform the LAN devices 18 concerning its status. It is to be appreciated by one skilled in the art that, the above message flow is but one possible message flow whereby a LAN device 18 may request a status change on an ICSD 10. Applications, as well as LAN devices, may request status information and status changes.

Figure 5:
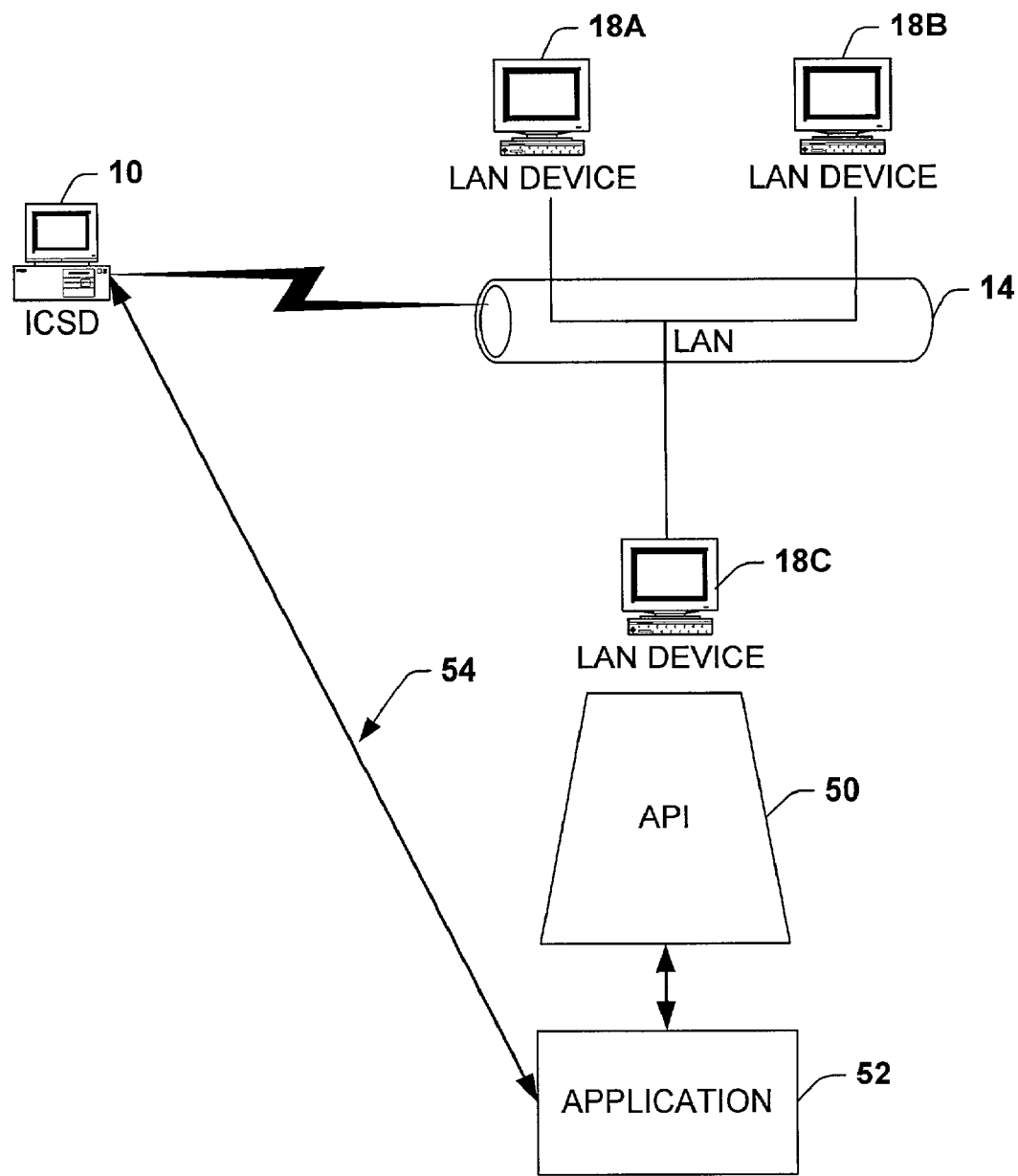
FIG. 5 illustrates an Application Programming Interface (API) facilitating communication between an application and an ICSD in accordance with an aspect of the present invention.

Thus, FIG. 5 illustrates an Application Programming Interface 50 (API), which facilitates communication between an application 52 and an ICSD 10. One or more applications may execute on the LAN devices 18. In FIG. 5, one such application 52 is illustrated as executing on LAN device 18C. The application 52 may attempt to detect, monitor and/or maintain the ICSD 10. Conventionally such detection, monitoring and maintaining has been difficult. Providing an API 50 to facilitate such detection, monitoring and maintaining mitigates the above-described problems by, for example, providing one or more procedures, objects, methods, variables, and other programmatic interface elements, operatively connected to the ICSD 10. Such an API 50 may enable applications 52 to deal with the ICSD 10 at a relatively high software interface level as opposed to a relatively low hardware level. For example, if applications 52 had any access to the ICSD 10, such access may have been via reading and writing values to and from specific hardware addresses on the ICSD 10. Hard-coding such hardware addresses into applications reduces flexibility and increases complexity. However, with the present invention, the API 50 may allow applications 52 to read and or write to a logical address, as opposed to a physical address, thus increasing flexibility and reducing complexity. Similarly, if applications 52 had any ability to affect the change of state of the ICSD 10, such ability may have been achieved through sending one or more binary codes, in accordance with one or more specific timing patterns, to the ICSD 10. For example, changing the dial state of the ICSD 10 may have required ten codes to be sent at ten precise time intervals. But the present invention may allow a higher level call, for example, change_dial_state(desired_state).

For example, the application 52 may run on the LAN device 18C and as part of general initializations the application 52 may attempt to determine the presence or absence of the ICSD 10. The present invention facilitates the application 52 determining the presence of absence of the ICSD 10 by providing the API 50 which may include a high level call, for example, ICSD_present( ). Once the application has determined the presence of the ICSD 10, the application 52 may further query the status of the ICSD 10. The present invention facilitates the application 52 querying the status of the ICSD 10 by providing the API 50 which may include a high level call, for example, get_ICSD_status( ). Once the application 52 has determined the status of the ICSD 10, the application 52 may further attempt to change the status of the ICSD 10. For example, if the application 52 determined that the ICSD 10 was not connected to the Internet, then the application 52 may request that the ICSD 10 connect to the Internet. The present invention facilitates the application 52 requesting a change of status at the ICSD 10 by providing the API 50, which may include a high level call, for example, change_dial_state(desired_state). Thus, the present invention mitigates problems associated with applications querying and requesting changes of status of an ICSD.

Figure 6:
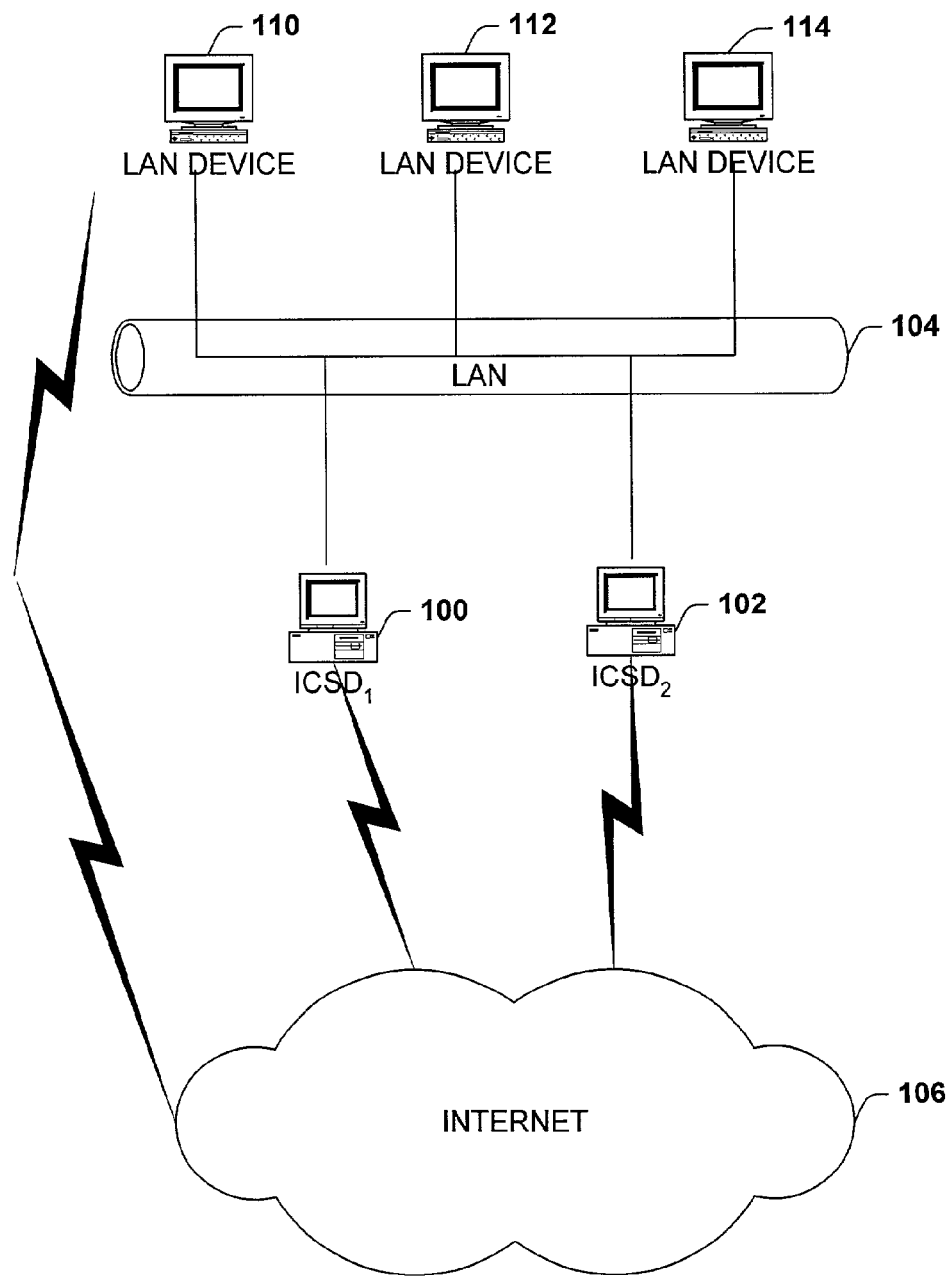
FIG. 6 illustrates multiple ICSDs associated with one LAN in accordance with an aspect of the present invention.

FIG. 6 illustrates multiple ICSDs 100 and 102 associated with one LAN 104. A LAN 104 may be associated with zero, one or more ICSDs. For each ICSD associated with the LAN 104, the detection of an ICSD, the monitoring of an ICSD and the maintaining of an ICSD described above may be possible. For example, when an $ICSD_1$ 100 boots up, it may advertise its presence using the status broadcast message described above. Similarly, when an $ICSD_2$ 102 boots up, it may also advertise its presence using the status broadcast message described above. Thus, the LAN devices 110,112, and 114 may detect the presence of more than one ICSD associated with the LAN 104. Similarly, the LAN devices 110, 112 and 114 connected to the LAN 104, may also communicate via the request/response protocol described above with the ICSDs 100 and 102. For example, the LAN device 110 may request that $ICSD_1$ 100 change its status to a first Internet connection speed, while the LAN device 114 may request that $ICSD_2$ 102 change its status to a second Internet connection speed.

The presence of an ICSD does not mandate that a LAN device communicate with the Internet 106 via the one or more ICSDs. A LAN device may bypass the one or more ICSDs and communicate directly with the Internet 106. For example, the LAN device 110 may communicate directly with the Internet 106 via its own internal modem, or DSL connection, for example, bypassing the ICSDs 100 and 102.

Figure 7:
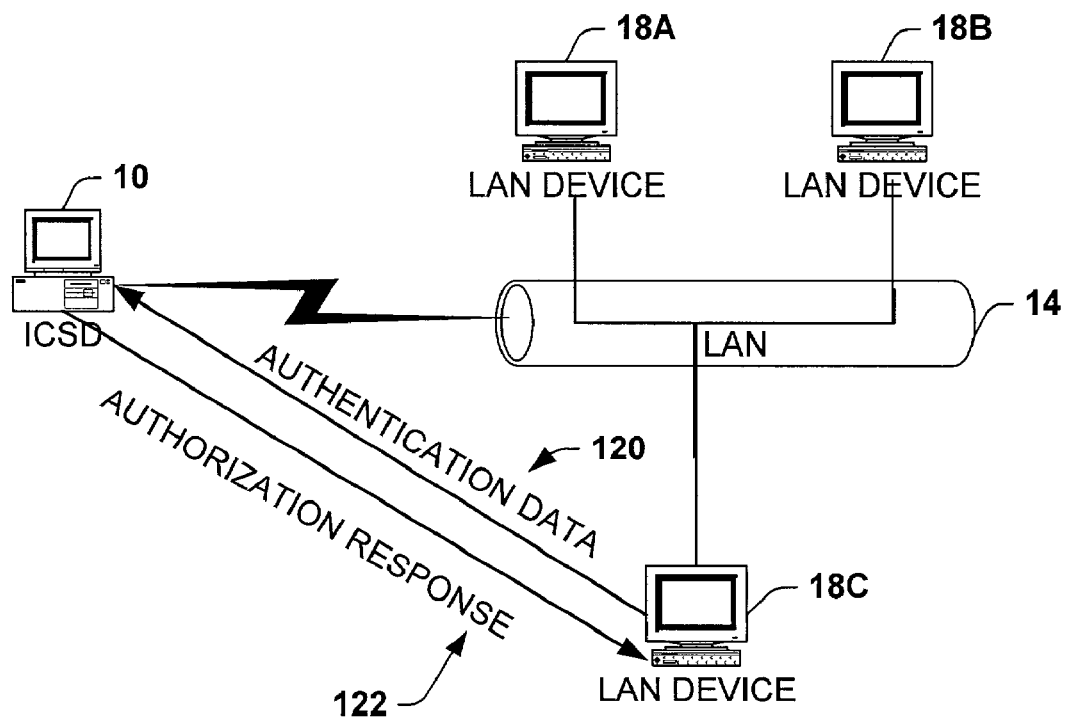
FIG. 7 illustrates an ICSD receiving authentication data and producing an authorization response in accordance with an aspect of the present invention.

FIG. 7 illustrates an ICSD 10 receiving an authentication data 120 and producing an authorization response 122. The authentication data 120 may be employed between the LAN devices 18 and the ICSD 10 to protect the ICSD 10 from receipt of messages from unauthorized LAN devices. The authentication data 120 may be, for example, a username/password combination, an authorization certificate, an authorization process or other identity indicators.

The ICSD 10 responds to the authentication data 120 via an authorization response 122. The authorization response 122 may be, for example, a signal and/or a data packet. The authorization response 122 may indicate which types of messages the ICSD 10 will accept from the LAN device that sent the authentication data 120. For example, the authorization response 122 may indicate that status queries may be accepted while requests to change the status of the ICSD 10 may not be accepted. The authorization response 122 may further indicate that the LAN device that sent the authentication data 120 may not communicate to the Internet via the ICSD 10.

Figure 8:
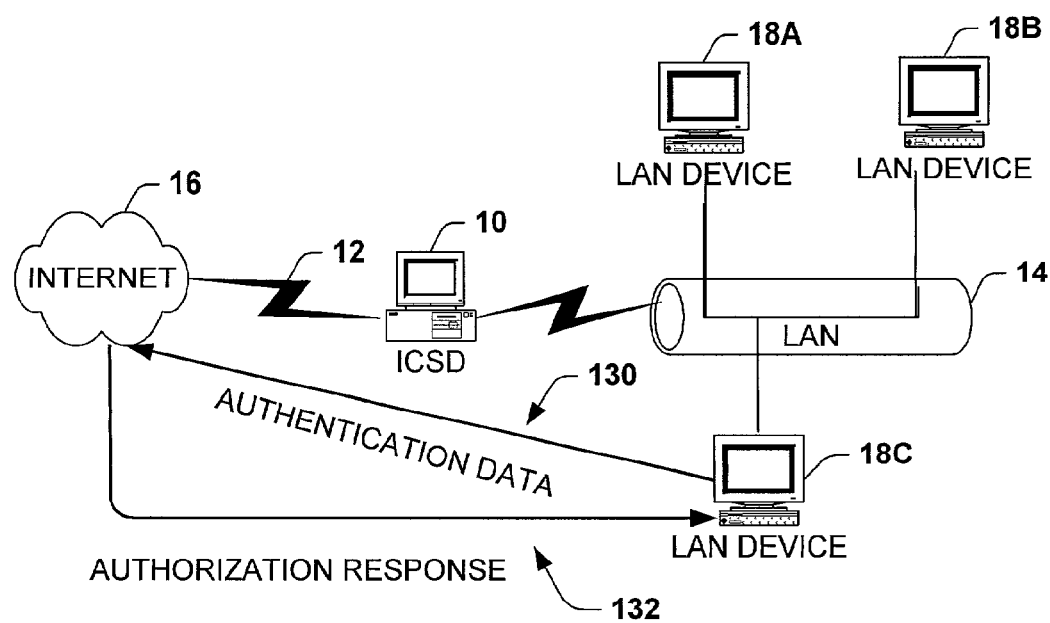
FIG. 8 illustrates an ICSD facilitating passing an authentication data and an authorization response between a device connected to a LAN and the Internet in accordance with an aspect of the present invention.

FIG. 8 illustrates an ICSD 10 passing an authentication data 130 and an authorization response 132 between a LAN device 18C and the Internet 16. The authentication data 130 may be, for example, a username/password combination, an authorization certificate, an authorization process or other means for indicating identity. Conventionally, the authentication data 130 may have been stored in the ICSD 10, making the authentication data 130 potentially available to unauthorized access. Enabling transmittal of the authentication data 130 from the LAN devices 18 to the Internet 16, without maintaining a persistent copy of the authentication data 130 in the ICSD 10 may enhance the ability of a LAN device 18 to maintain a secure connection to the Internet 16.

Figure 9:
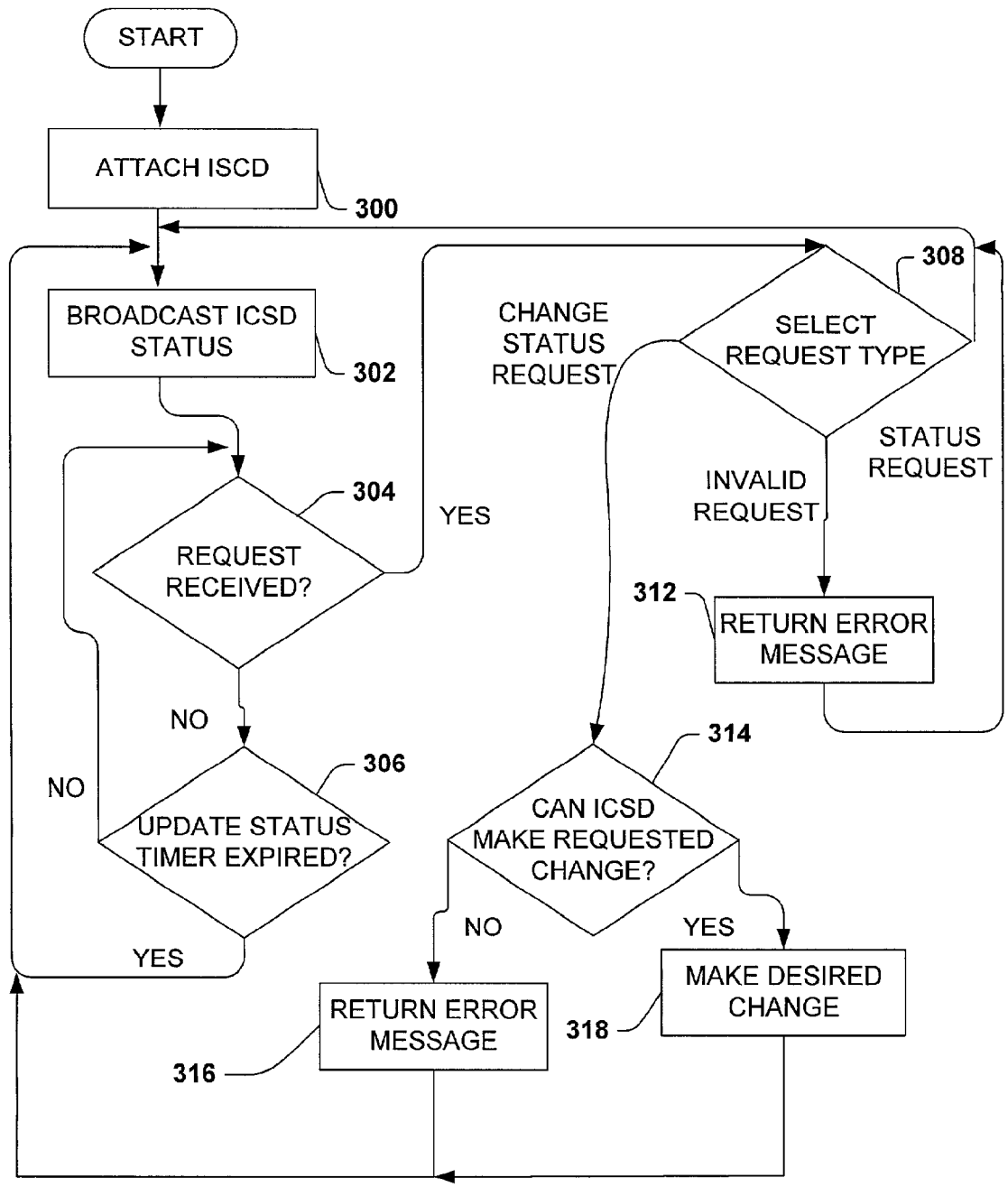
FIG. 9 is a flow chart illustrating processing associated with detecting, monitoring and maintaining an ICSD connected to a LAN in accordance with an aspect of the present invention.

FIG. 9 is a flow chart illustrating processing associated with detecting, monitoring and maintaining an ICSD connected to a LAN. At step 300, an ICSD is connected to a LAN. Such connection may be a physical connection (e.g. Ethernet, Token Ring, modem,) or a wireless connection (e.g. cellular, FM). Next at step 302 the ICSD may broadcast a status message to LAN devices associated with the LAN. Thus, the presence of the ICSD may be detected by LAN devices that receive the broadcast message. Further, the services available in the ICSD may also be advertised via broadcasting the status message, and thus the LAN devices may become aware of the services the ICSD has available.

At step 304, the ICSD determines whether a request has been received from a LAN device. If the determination at 304 is NO, then at step 306, a determination is made concerning whether an update status timer has expired. If the update status timer has not expired, then the ICSD will repeat the determination of step 304 of whether a request has been received. If the update status timer has expired, then the ICSD will reset the update status timer and broadcast an ICSD status message at step 302. Thus, LAN devices may periodically be updated concerning the ICSD status without requesting such an update.

If at step 304 the determination was YES, that a request had been received by the ICSD, then at step 308 a determination is made concerning the type of request received. If a status request was received, then at step 302 a status message may be broadcast. If an invalid request was received, then at step 312 an error message may be returned and then at step 302 a status message may be broadcast. If it was determined at step 308 that a request to change the status of the ICSD was received, then at step 314 a determination is made concerning whether the ICSD can make the requested change. For example, a request to change the ICSD connection status from disconnected to connected may not be possible, (e.g. connection to Internet is down due to cable break) while a request to change the ICSD connection status from connected to disconnected may be possible (e.g. by hanging up the phone). If the determination at step 314 is NO, then at step 316 an error message may be returned and at step 302 an ICSD broadcast status message may be sent. If the determination at step 314 is YES, then at step 318 the requested change may be made and at step 302 an ICSD broadcast status message may be sent. This processing thus facilitates detecting, monitoring and maintaining an ICSD, mitigating problems as described above.

Figure 10:
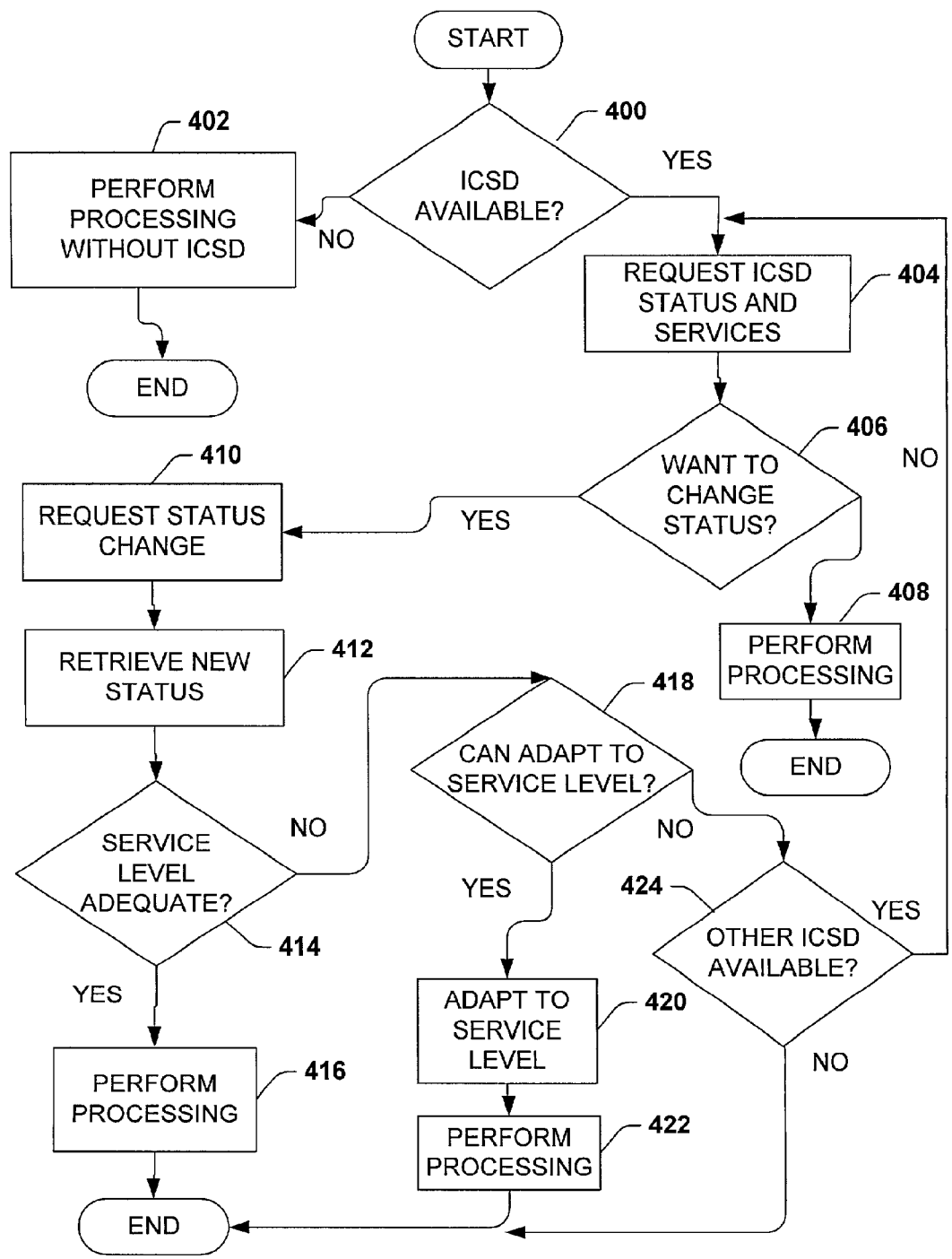
FIG. 10 is a flow chart illustrating interactions between a device connected to a LAN and an ICSD in accordance with an aspect of the present invention.

FIG. 10 is a flow chart illustrating an interaction between a device connected to a LAN and an ICSD. At step 400 the LAN device may determine whether an ICSD is available. For example, the LAN device may send a request for ICSD status to a well-known port (e.g. ICSLAP_PORT) and monitor the reply. If no reply is forthcoming, then no ICSD may be available. Conversely, one or more ICSDs may respond with broadcast status messages, and thus the LAN device may detect that an ICSD is present. If the determination at step 400 is NO, then at step 402, the LAN device may perform processing without the ICSD. For example, a web browser may determine that it may only work in an offline mode. If the determination at step 400 is YES, then at step 404 the LAN device may request the ICSD status and services available from the ICSD. For example, the LAN device may send an ICSD status request to one or more of the ICSDs that responded to the determination request of step 400.

At step 406, a determination is made concerning whether the LAN device will attempt to change the status of the ICSD based on the status returned in response to the request of step 404. If the determination at step 406 is NO, then at step 408 the LAN device may perform the processing with the existing status in the ICSD. For example, the ICSD may be in a disconnected state. Thus, the LAN device may request that the ICSD make a connection to an ISP. If the determination at step 406 is YES, then at step 410, the LAN device may transmit a request to change the status of the ICSD. For example, the LAN device may request that the ICSD make an Internet connection. At step 412, the LAN device may retrieve the status of the ICSD after the request to change the status of the ICSD.

At step 414, a determination is made concerning whether the service level at the ICSD meets or exceeds a threshold level for the processing desired by the LAN device. For example, if a LAN device requires a 56.6 Kbps data transfer rate, and only a 28.8 Kbps transfer rate was established when the connection was made to the Internet, (e.g. a slower modem was chosen from a pool of modems available to the ICSD), as reported by one or more IEs transmitted from the ICSD, then the level of service does not meet the threshold level required by the LAN device. If at step 414 the determination is YES, then at step 416 the processing may be performed. For example, if the Internet connection now meets or exceeds a predetermined threshold, the LAN device may perform desired data transfer processing. For example, if a LAN device requires a 56.6 Kbps data transfer rate, and a 1 Mbps transfer rate was established when the connection was made to the Internet (e.g. DSL line was available so POTS modem not used), as reported by one or more IEs transmitted from the ICSD, then the level of service meets the threshold level required by the LAN device. If at step 414 the determination was NO, that the service level available at the ICSD was inadequate, then at step 418 a determination may be made concerning whether the LAN device can adapt to the available level of service. If at step 418, the determination is YES, that the LAN device can adapt to the available level of service, then at step 420 such adaptation may occur and at step 422 the desired processing may occur. For example, a LAN device may operate optimally at a first Internet connection speed, but a second Internet connection speed may have been established by the ICSD when connecting to the Internet. The LAN device may then have determined that although the first Internet connection speed requested was not available, the LAN device could adapt to the second Internet connection speed and thus proceed with desired processing at that second Internet connection speed. If the determination at step 418 was NO, that the LAN device could not adapt to the service level available in the ICSD, then at step 424 a determination may be made concerning whether one or more other ICSDs are available. If the determination at step 424 is NO, then the LAN device may decide not to perform the desired processing. If the determination at step 424 is YES, that one or more other ICSDs are available, then at step 404 the LAN device may request the status and services available at one or more of the other ICSDS available.

Figure 11:
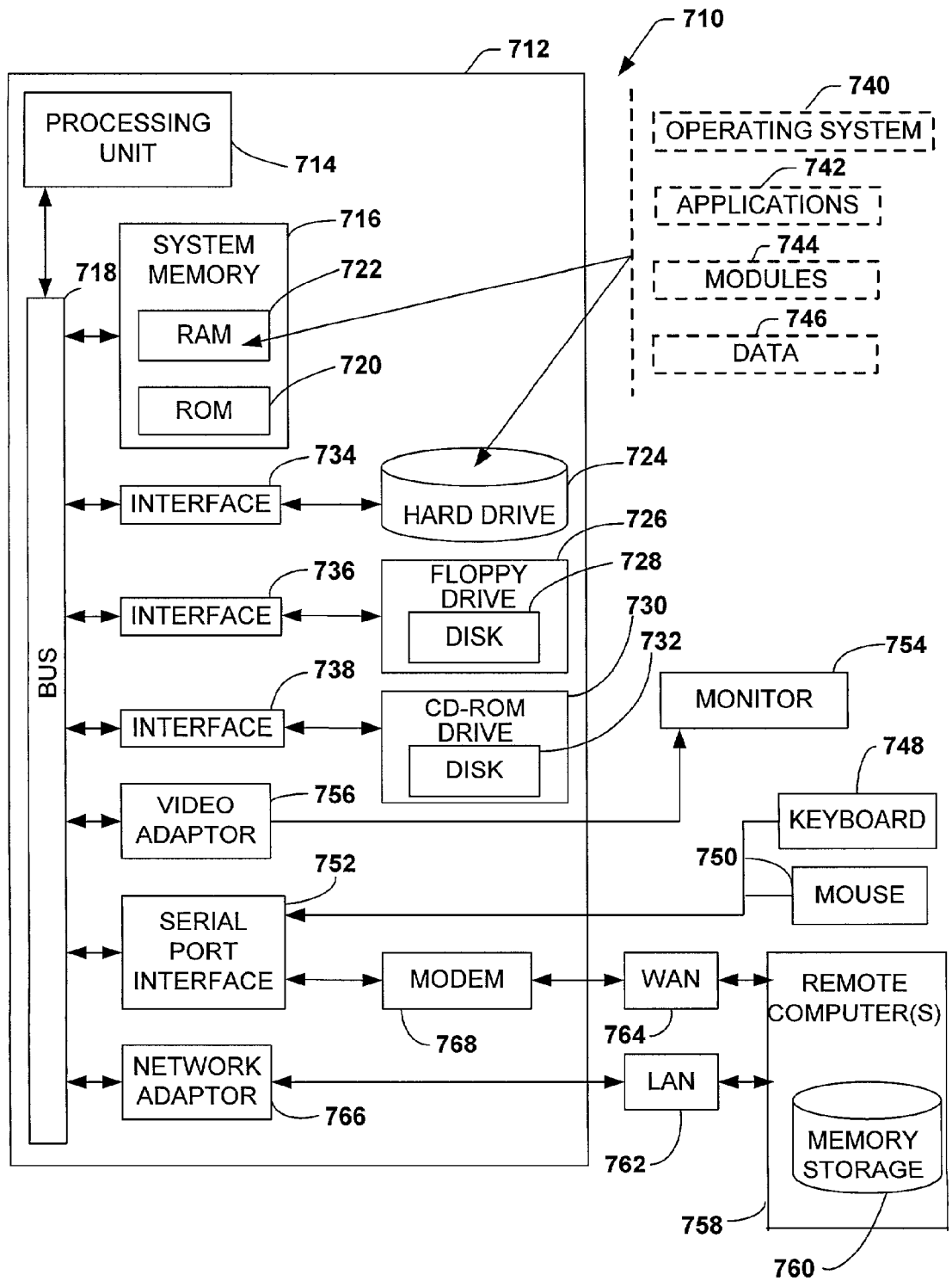
FIG. 11 is a schematic block diagram of an exemplary operating environment for a system configured in accordance with the present invention.

With reference to FIG. 11, an exemplary environment 710 for implementing various aspects of the invention includes a computer 712, including a processing unit 714, a system memory 716 and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structures including a memory bus or memory controller, a peripheral bus, and a local bus using any of a variety of commercially available bus architectures. The computer 712 memory may include read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744 and program data 746. Any operating system suitable for employment in connection with the herein described invention may be employed.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754, or other type of display device, is also connected to the system bus 718 via an interface, such as a video adapter 756. In addition to the monitor, a computer typically includes other peripheral output devices (not shown), such as speakers, printers, etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752 (e.g. for communications over POTS) or may alternatively be connected via a network interface or adapter 766 (e.g. for communication over DSL and/or cable). In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A system for managing an Internet Connection Sharing Device (ICSD), comprising:
   an ICSD that utilizes frequency sharing to concurrently share a single Internet connection between at least two devices, the ICSD creates an ICSD status message that relates to status of the ICSD; and
   a monitor that senses presence of the ICSD, the monitor comprising:
      a component that generates one or more requests that the ICSD generate the ICSD status message;
      a component that receives the ICSD status message, and
      a component that interprets the ICSD status message.

2. The system of claim 1, the monitor further comprising:
   a component that generates a request that the ICSD change status.

3. The system of claim 2, the monitor further comprising:
   a component that interprets a response to a request that the ICSD change status.

4. The system of claim 2, the ICSD changes status based on the request and generates the response including data associated with such status change.

5. The system of claim 4, wherein the application adapts the behavior of one or more ICSDs connected to a local area network (LAN) with which the ICSD is associated.

6. The system of claim 1, the monitor is an application program running on a computer connected to the ICSD.

7. The system of claim 1, wherein the ICSD authenticates the authority of a sender of the request that the ICSD generate the ICSD status message to facilitate securing the ICSD from an unauthorized request.

8. A computer readable medium storing the components of claim 1.

9. A method for managing an Internet Connection Sharing Device (ICSD), comprising:
utilizing an ICSD to provide frequency sharing of a single Internet connection between two or more devices;
detecting the presence of the ICSD;
requesting that the ICSD generate an ICSD status message;
generating the ICSD status message;
interpreting the ICSD status message; and
changing the status of at least one of the following based on the interpretation of the ICSD status message: a device utilizing the single Internet connection; and the ICSD providing the frequency sharing of the single Internet connection.

10. The method of claim 9, further comprising:
generating a request that the ICSD change status.

11. The method of claim 10, further comprising:
interpreting a response to the request that the ICSD change status;
changing the status of the ICSD based on the request; and
generating the response including data associated with such status change.

12. The method of claim 11, further comprising:
authenticating the authority of a sender of the request that the ICSD generate the ICSD status message, to facilitate securing the ICSD from an unauthorized request.

13. The method of claim 12, further comprising:
manipulating the behavior of one or more ICSDs connected to a local area network (LAN) with which the ICSD is associated.

14. The method of claim 11, wherein detecting the presence of the ICSD is performed by a computer application running on a computer operably connected to the ICSD.

15. The method of claim 9, wherein detecting the presence of the ICSD is performed by a computer application running on a computer operably connected to the ICSD.

16. A computer readable medium having computer executable instructions for performing the method of claim 15.

17. A computer readable medium having computer executable instructions for performing the method of claim 9.

18. A system for managing an Internet Connection Sharing Device (ICSD), comprising:
means for simultaneously and concurrently sharing a single Internet connection between at least two devices utilizing frequency sharing;
means for determining that an ICSD is operably connected to the system;
means for requesting the ICSD to transmit an ICSD status message including data associated with at least one of the ICSD and a device utilizing the single Internet connection;
means for generating the ICSD status message;
means for receiving and analyzing the ICSD status message; and
means for changing the status of at least one of a device utilizing the single Internet connection and the ICSD.

19. The system of claim 18, further comprising:
means for generating a request that the ICSD change status.

20. The system of claim 19, further comprising:
means for analyzing a response to the request that the ICSD change status.

21. The system of claim 20, further comprising:
means for authenticating a sender's authority to request that the ICSD change status.

22. The system of claim 21, further comprising:
means for adapting the behavior of one or more ICSDs connected to a local area network (LAN) with which the ICSD is associated.

23. A system for managing an Internet Connection Sharing Device (ICSD), comprising:
a plurality of devices coupled to a network utilizing an ICSD that enables frequency sharing for the simultaneous sharing of a single Internet connection between the plurality of devices, at least one of the devices operative to generate an ICSD status request;
a request receiving system (RRS) that receives the ICSD status request;
a status generator that generates an ICSD status message in response to the ICSD status request;
the ICSD status message includes data associated with at least one of the following: a presence of an Internet connection, an absence of an Internet connection, a speed related to the Internet connection, a byte counter, an Internet Protocol (IP) address related to the Internet connection, a number of nodes, and a time on the ICSD; and
a status broadcasting system that broadcasts the ICSD status message to the plurality of devices via the network.

24. The system of claim 23, the network comprising a Local Area Network (LAN).

25. The system of claim 23, the network comprising a Wide Area Network (WAN).

26. A system for managing an Internet Connection Sharing Device (ICSD), comprising:
an ICSD that utilizes frequency sharing to simultaneously and concurrently share a single Internet connection between at least two devices, the ICSD creates an ICSD status message that relates to the status of the ICSD; and
a monitor that senses the presence of the ICSD that allows the concurrent and concurrent sharing of an Internet connection, the monitor comprising:
a component that generates one or more requests that the ICSD create an ICSD status message;
a component that authenticates the one or more requests to create the ICSD status message;
a component that creates the ICSD status message based upon the authentication;
the ICSD status message includes data associated with a presence of an Internet connection, an absence of an Internet connection, a speed related to the Internet connection, a byte counter, an Internet Protocol (IP) address related to the Internet connection, a number of nodes, and a time on the ICSD;
a component that receives and interprets the ICSD status message, and
a component that facilitates managing the ICSD based at least upon the ICSD status message.

27. The system of claim 26, the monitor further comprising:
a component that generates a request that the ICSD change status;
a component that authenticates the request that the ICSD change status;
a component that interprets the request that the ICSD change status, and a component that changes the status of the ICSD based at least upon the authenticated request that the ICSD change status.

28. A method for managing an Internet Connection Sharing Device (ICSD), comprising:
   utilizing an ICSD to provide frequency sharing of a single Internet connection between two or more devices;
   detecting the presence of the ICSD that allows the sharing of the Internet connection;
   generating one or more requests that the ICSD create an ICSD status message;
   authenticating the request;
   creating the ICSD status message, the ICSD status message includes data related to at least one of a presence of an Internet connection, an absence of an Internet connection, a speed related to the Internet connection, a byte counter, an Internet Protocol (IP) address related to the Internet connection, a number of nodes, and a time on the ICSD;
   interpreting an ICSD status message, and
   managing the ICSD based at least upon the ICSD status message.

* * * * *